United States Patent [19]

Cartry

[11] Patent Number: 5,443,201
[45] Date of Patent: Aug. 22, 1995

[54] METHOD AND DEVICE FOR REPAIRING A DEFECTIVE ZONE OF THE WALL OF A METAL PART AND IN PARTICULAR OF A TUBULAR PART

[75] Inventor: Jean Pierre Cartry, Lyons, France

[73] Assignee: Framatome, Courbevoie, France

[21] Appl. No.: 158,881

[22] Filed: Nov. 29, 1993

[30] Foreign Application Priority Data

Nov. 30, 1992 [FR] France ............... 92 14407

[51] Int. Cl.⁶ .................... B23P 15/26; B23P 9/04
[52] U.S. Cl. ..................... 228/119; 228/125; 427/422; 72/53; 219/76.16
[58] Field of Search ............... 228/119, 125; 219/76.16; 72/53; 427/422

[56] References Cited

U.S. PATENT DOCUMENTS

| | | | |
|---|---|---|---|
| 4,224,356 | 9/1980 | Singer | 427/422 X |
| 4,491,001 | 1/1985 | Yoshida et al. | 228/125 X |
| 4,661,682 | 4/1987 | Gruner et al. | 219/76.16 X |
| 4,713,882 | 12/1987 | Bianchi | 72/53 X |
| 4,893,490 | 1/1990 | Isnardon et al. | 72/53 |
| 4,974,434 | 12/1990 | Reccius et al. | 72/53 |

FOREIGN PATENT DOCUMENTS

| | | |
|---|---|---|
| 0181810 | 5/1986 | European Pat. Off. . |
| 0261376 | 8/1987 | European Pat. Off. . |
| 0300458 | 1/1989 | European Pat. Off. . |
| 0515173 | 11/1992 | European Pat. Off. . |
| 208793 | 8/1988 | Japan .................... 148/519 |
| 2098732 | 11/1982 | United Kingdom . |
| 1655997 | 6/1991 | U.S.S.R. .................... 148/519 |

OTHER PUBLICATIONS

Search Report FR 92 14 407.
Abstracts of Japan JP 1062290 Mar. 1989.
Abstracts of Japan JP 3170093 Jul. 1991.

*Primary Examiner*—Kenneth J. Ramsey
*Attorney, Agent, or Firm*—Pollock, Vande Sande & Priddy

[57] ABSTRACT

The metal of the wall of the part (13a) in a zone which includes defects such as cracks is melted, over a defined depth, by moving over the surface of the part with the aid of a melting device (21), and then solidified. Next, a surface layer of the metal of the wall of the part (13a) which has been melted and then solidified is subjected to compression by repeated impacts of solid particles. The melting is preferably performed by a transferred-arc plasma (22) and the compression by balls set into motion by a vibrating part. The invention applies in particular to the repair of a tubular adaptor (13a) penetrating the head (1) of a nuclear-reactor vessel.

18 Claims, 7 Drawing Sheets

METHOD AND DEVICE FOR REPAIRING A DEFECTIVE ZONE OF THE WALL OF A METAL PART AND IN PARTICULAR OF A TUBULAR PART

FIELD OF THE INVENTION

The invention relates to a method and a device for repairing a defective zone of the wall of a metal part and in particular of a tubular part such as an adaptor penetrating the head of the vessel of a nuclear reactor cooled by pressurized water.

BACKGROUND OF THE INVENTION

Pressurized-water nuclear reactors generally include a vessel enclosing the reactor core which is submerged in the pressurized water for cooling the core.

The reactor vessel, of cylindrical overall shape, includes a head of hemispherical shape which may be attached to its upper portion. The head is pierced with openings at each of which is fixed, by welding, a tubular penetration part constituting an adaptor providing for the passage of the drive for moving a follower of a rod for controlling the reactivity of the core or a passage for penetration of a measuring means into the core, such as a column of thermocouples.

The mechanisms for actuating the movement of the rods for controlling the reactivity of the core are fixed to the end portions of each of the adaptors.

A thermal sleeve is fixed inside each of the tubular penetrations of the vessel head, in a position coaxial in favor of the tubular penetration part and with a certain radial clearance, this thermal sleeve including a diametrally enlarged portion resting on a diametrally enlarged hearing surface located at the upper portion of the bore of the tubular penetration part and which is mounted so as to rotate freely inside the penetration.

The followers of the rods for controlling the reactivity of the nuclear reactor penetrate the vessel head, inside the thermal sleeves which are themselves arranged coaxially inside the adaptors of the control rods or, more generally, inside the tubular penetration parts of the head.

In order to increase the reliability and the operating safety of the nuclear reactors and in order to extend the lifetime of these reactors, the plant operators are required to carry out increasingly numerous inspections of the various elements constituting the nuclear reactor and repairs of these elements when defects are detected.

In particular, it may be necessary to inspect the state of the penetration parts of the head of the vessel in order to assure the integrity of these parts, after the reactor has been operated for a certain time, in particular in the zone where these tubular parts are welded to the vessel head.

Various inspection methods and devices have been proposed enabling defects on the inner surface of the tubular penetration part to be detected and the defects which have been detected and located to be repaired.

In particular, methods and devices have been proposed making it possible to carry out the inspection by using ultrasound or eddy currents or even by using a liquid-penetration method with remote endoscopic examination of the internal surface of the penetration part, such as an adaptor.

In order to carry out the repair of the zones exhibiting defects and, in particular, cracks extending over a certain depth into the wall of the adaptor, from its inner surface, various methods have been proposed, such as cutting away by machining followed by a build-up in the defective zone, cutting away the defects by machining without build-up, or coating with a layer such as an electrolytic nickel layer.

Inspections or repairs carried out on the internal surface of the adaptor most often require dismantling of the thermal sleeve in order to provide access to the internal surface of the bore of the adaptor.

Inspections and repairs are carried out during a shutdown of the nuclear reactor, the head of the vessel being dismantled and placed on a maintenance/repair stand.

Most repair methods used to date require the identification and precise location of the cracks, as well as a determination of the depth of penetration of the cracks in the wall of the adaptor. It may be necessary to carry out several machining passes with an inspection of the machined zone between two successive machining passes.

Furthermore, when a repair by build up turns out to be necessary, after cutting away the surface of the adaptor, stresses are created in the metal deposited by build-up and in the metal of the adaptor in the vicinity of the built-up zone. These stresses may cause new cracking of the adaptor, after the head of the vessel has been put back into service and after the reactor has been operated for a certain period.

More generally, it may be necessary to use an effective method for repairing defective zones, elements of a nuclear reactor other than adaptors and, in particular, elements of tubular shape such as the sleeves for penetrating the vessel bottom head of a pressurized-water nuclear reactor providing for the passage of instrumentation guide conduits. Such a repair method has to be able to be implemented remotely, very safely and with as few inspection operations as possible.

The repairs carried out must also make it possible to prevent the appearance of new cracking in the repaired zones or in their vicinity.

SUMMARY OF THE INVENTION

The object of the invention is therefore to propose a method for repairing a defective zone of the wall of a metal part and in particular of a tubular part, in which the metal of the wall exhibits defects such as cracks, this method making it possible to perform an effective repair, to prevent the appearance of new cracks when the metal part is put back into service and to be able to be implemented without having to perform numerous and accurate inspection operations.

With this object in mind:
- the metal in the defective zone is melted on the wall, over a defined thickness, by moving over a surface of the wall in the defective zone with the aid of a heat source, and then solidified, and
- a surface layer of the solidified metal, at least in the defective zone, is subjected to compression, after melting and solidification, by repeated impacts of solid particles.

The invention in particular relates to a method for repairing a defective zone of the wall of an adaptor for penetrating the head of the vessel of a pressurized-water nuclear reactor in which a thermal sleeve is arranged, the metal of the wall exhibiting defects such as cracks, wherein:

the thermal sleeve of the adaptor to be repaired is cut by: cutting-tool, water-jet or electrical-discharge machining, the thermal sleeve of the adaptor is extracted, the internal surface of the adaptor is inspected by using: eddy currents, ultrasound or liquid-penetration, so as to locate the zone to be repaired, the metal of the wall of the adaptor, in the defective zone, is melted with the aid of a heat source and then solidified, a surface layer of the metal of the wall of the adaptor, at least in the defective zone, is subjected to compression, after melting and solidification, by repeated impacts of solid particles, the zone of the adaptor which has been melted, solidified and compressed is inspected by using eddy currents or ultrasound, and a new thermal sleeve is put into place inside the adaptor.

BRIEF DESCRIPTION OF THE DRAWINGS

In order for the invention to be clearly understood, a description will now be given, with reference to the appended drawings, of an embodiment of the method according to the invention, in the case of the repair of an adaptor penetrating the head of the vessel of a pressurized-water nuclear reactor and the devices enabling this method to be implemented.

DETAILED DESCRIPTION

Figure 1:
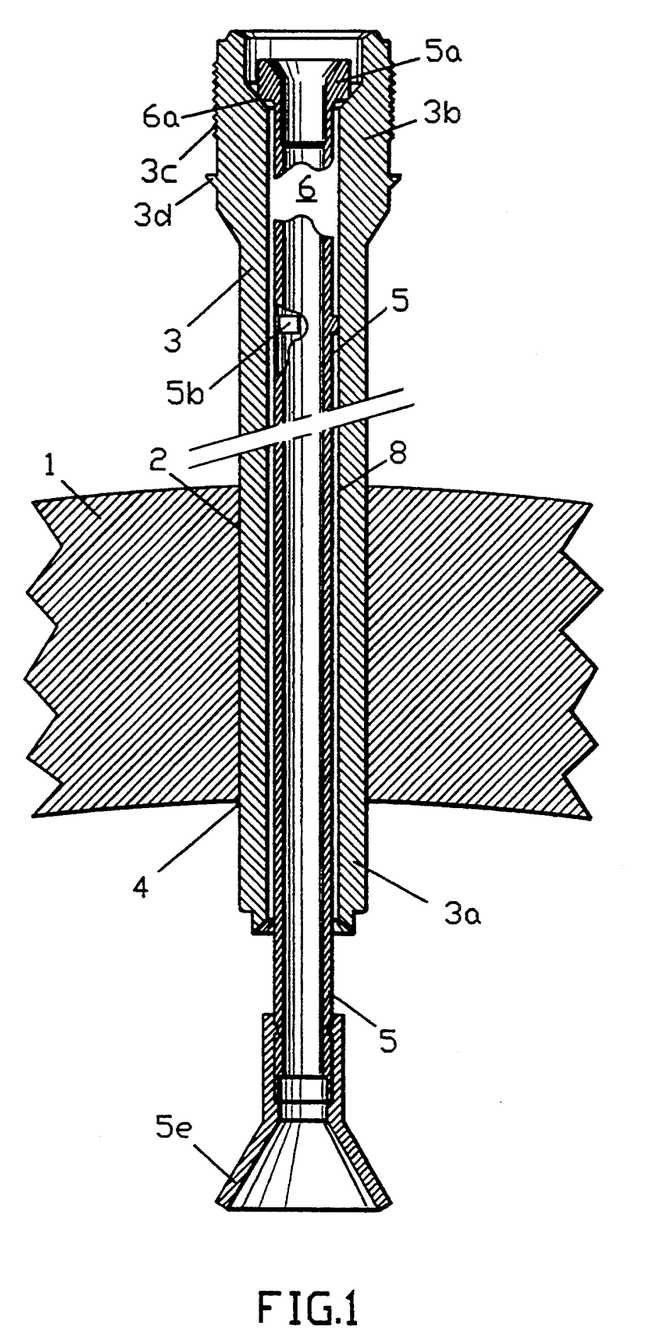
FIG. 1 is a sectional view in a vertical plane of an adaptor penetrating the head of the vessel of a pressurized-water nuclear reactor.

FIG. 1 shows a portion of a head 1 of a vessel of a pressurized-water nuclear reactor which is penetrated by an opening 2 inside which is fixed a tubular part 3 constituting an adaptor permitting the passage of a follower providing for the movement of a control rod inside the nuclear-reactor vessel.

The tube-shaped adaptor 3 includes a running-through portion 3a, the diameter of which corresponds to the diameter of the opening 2 and which is fixed by means of an annular weld bead 4 on the lower inner face of the head 1, so as to project below this lower inner face. The adaptor 3 includes a diametrally enlarged upper portion 3b located outside and above the head 1 of the vessel.

A tubular thermal sleeve 5 is arranged coaxially inside the inner bore of the adaptor 3.

The thermal sleeve 5 includes a diametrally enlarged upper portion 5a resting on a frustoconical bearing surface 6a constituting the upper portion of the inner bore 6 of the tubular adaptor 3.

In addition, the sleeve 5 includes, on its outer surface, at least one set of three lugs 5b projecting radially outwards and arranged at 120° to each other around the axis of the sleeve 5 and bearing against the internal surface of the inner bore 6 of the adaptor 3, when the sleeve 5 is mounted inside the adaptor.

The sleeve 5 has an outer diameter which is substantially less than the internal diameter of the bore 6, so that an annular space 8 of constant width remains between the outer surface of the sleeve 5 kept in a position which is perfectly coaxial with the bore 6 by means of the lugs 5b and the inner surface of the bore 6.

The diametrally enlarged upper portion 3b of the adaptor 3 includes, on its outer surface, a thread 3c and a lip 3d projecting from the outer surface of the portion 3b.

The drive mechanism of the adaptor 3, permitting the movement of the follower and of the control rod penetrating the head inside the adaptor, is fixed to the upper portion of the adaptor 3 by screwing onto the threaded portion 3c and made to bear on the lip 3d.

The fixing of the drive mechanism is completed by a sealing weld bead providing the joint between the mechanism and the adaptor along the lip 3d.

The thermal sleeve 5 is rigidly connected at its lower portion, beneath the vessel head and the lower portion of the adaptor 3, to an alignment cone 5e permitting, upon putting the head I into position on the reactor vessel, the alignment of the ends of the control rod drive shafts constituting the followers of these rods engaged in the vertical direction inside the core of the reactor arranged in the vessel.

After the reactor has been operated for a certain time, it is necessary to check the state of the adaptors penetrating the head of the vessel and, in particular, of that portion of the adaptors where they are fixed to the vessel head by means of an annular weld such as 4.

This inspection, essentially pertaining to the inner surface of the bore 6 of the adaptor in the weld zone 4, may be performed, before or after dismantling the thermal sleeve, by moving a probe such as an eddy-current probe over the internal surface of the bore 6 of the adaptor. The inspection may also be performed by employing ultrasound or, after dismantling the sleeve, by employing an inspection technique using liquid-penetration.

When cracks have been detected on the inner surface of one or more adaptors penetrating the head 1 of the vessel, it is necessary to repair the wall of the adaptor in the defective zone where the cracks have been detected.

Figure 2:
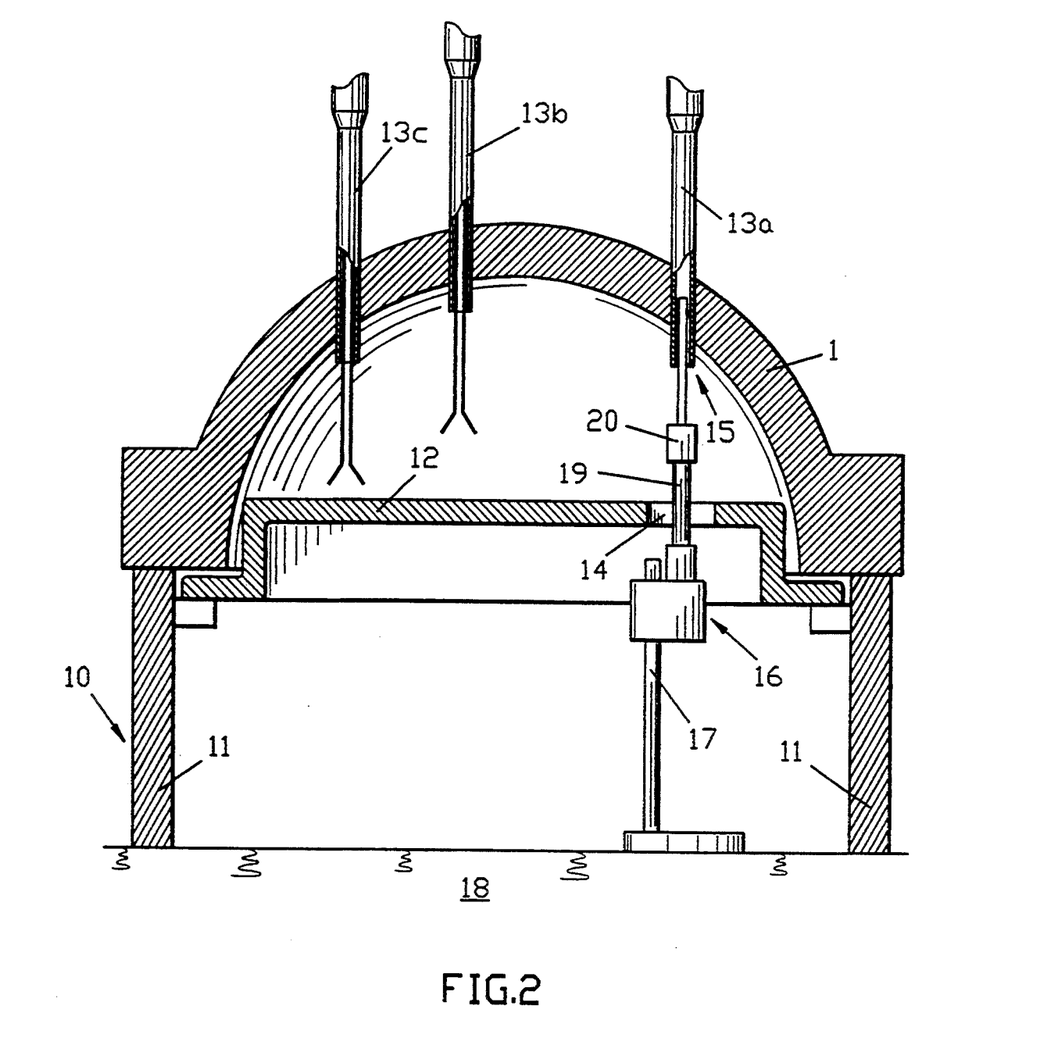
FIG. 2 is a view, in elevation and in section in a vertical plane, of a vessel head in position on a maintenance/repair stand, during the implementation of the method according to the invention.

The inspection of the adaptors and the repairs of any defective zones detected inside these adaptors may be performed on a maintenance/repair stand 10, as shown in FIG. 2.

In FIG. 2, the maintenance/repair stand, which is shown schematically, includes vertical supports 11 on the upper portion of which the head 1 rests in a position corresponding to its service position on the reactor vessel.

The maintenance/repair stand 10 includes a mechanism plate 12 resting on a portion of the supports 11 or on independent supports, so as to be in a horizontal position beneath the lower ends of the thermal sleeves of the adaptors, 13b and 13c penetrating the vessel head 1.

In addition, the mechanism plate 12 includes a through-hole 14 which is vertically aligned with an adaptor 13a on the internal surface of which defects have been detected and in which a defective zone is repaired, by using the method according to the invention.

The thermal sleeve of the adaptor 13a has been dismantled, either in order to carry out the inspection of the inner surface of the adaptor or with a view to the repair by using the method according to the invention. The thermal sleeve may be dismantled by cutting it from the inside and extracting the cut section from beneath the head.

The cutting may be carried out from inside the sleeve a cutting tool, by means of a pressurized-water jet or by electrical-discharge machining.

The inspection may be performed by using eddy currents, ultrasound or liquid-penetration.

In the case where the inspection is performed by using eddy currents or ultrasound, the inspection may possibly be performed without removing the thermal sleeve.

The repair inside the adaptor 13a, by using the method according to the invention, is carried out by employing a tool 15 which is inserted and moved inside the adaptor, by employing a mechanical support, guide and movement assembly 16 which is itself mounted for movement on a vertical guide column 17 resting on the floor 18 of the maintenance/repair stand 10.

The repair tool 15 is constituted, during the first phase of the repair method according to the invention, by a means for melting the internal surface of the adaptor which may be simultaneously moved in the axial direction of the adaptor 13a and rotated about the axis of the adaptor. It is thus possible to cause, during the first phase of the repair method according to the invention, melting followed by solidification over the entire defective surface by moving over the latter in a helical path.

In the second phase of the repair method according to the invention, the repair tool 15 may be constituted by a shot-blasting tool which is installed in the adaptor 13a in the region of the defective zone in order to subject the surface of the defective zone, which was previously reflowed and solidified, to compression by shot-blasting.

The various operations necessary for implementing the method according to the invention may be controlled by an operator located in the maintenance/repair station 10, beneath the mechanism plate 12, which biologically protects the operator from radiation coming from the lower portion of the head 1.

The installation of the tool 15 inside the adaptor 13a may be carried out by the operator, by employing means for guiding and moving the assembly 16 carrying the tool 15 along the guide column 17.

During the maintenance/repair work, the tool 15 may be moved in the axial direction, inside the adaptor 13a, by the movement device 16 carrying the tool 15 by means of a vertical mast 19 and of a rotary support 20 enabling the tool 15, inside the adaptor 13a, to be rotated about the axis of the adaptor.

Figures 3, 3A:
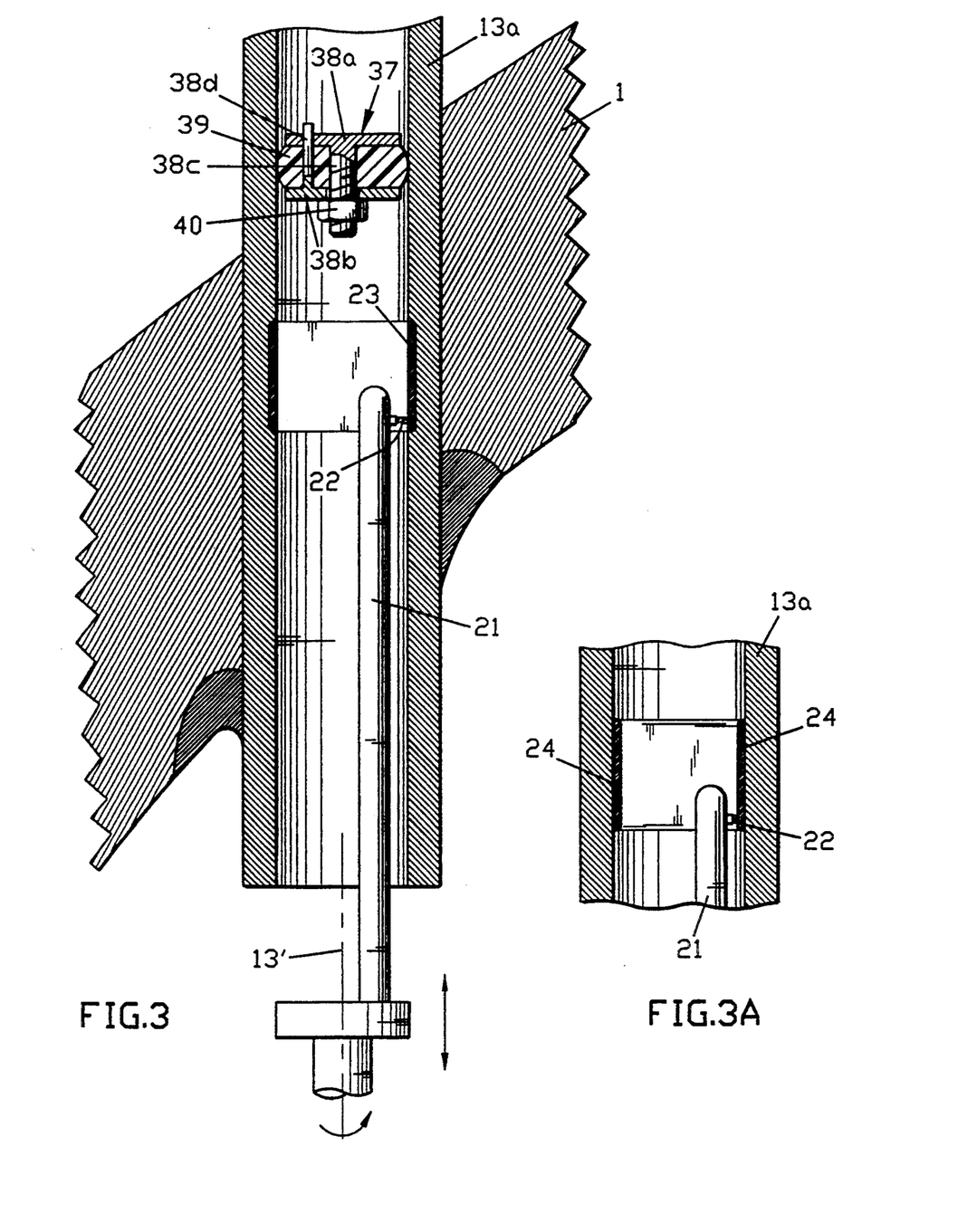
FIGS. 3 and 3A are views, in section and in elevation, of a portion of an adaptor into which a transferred-arc plasma melting device is inserted, enabling the first phase of the method according to the invention and according to two variants to be performed.

FIG. 3 shows the adaptor 13a penetrating the vessel head 1, in which adaptor is installed a transferred-arc plasma reflow and metal deposition tool 21 which may be fixed to a rotary support such as the support 20 shown in FIG. 2, in the same manner as the tool 15. In this way, the transferred-arc plasma melting tool 21 may be installed inside the adaptor 13a so as to cause melting in a defective zone, and be moved translationally towards the axis of the adaptor 13a and rotationally about the axis of the adaptor, by virtue of devices such as the rotary support 20, the movement means 16 and the guide column 17, all shown in FIG. 2.

The transferred-arc plasma technique for melting or for welding with or without filler metal is known and employs a torch which includes a central cathode and an anode and one or more peripheral conduits. The electrode is connected to a current source, so that an arc can be formed between the cathode and the anode. A gas, such as argon, is sent via a peripheral pipe into the zone where the arc, called the pilot arc, is formed. A plasma is thereby formed. A second arc, called the transferred arc, is established with the part on which the melting or the welding is carried out, which is at an anodic potential. This arc constitutes the element for heating the part. The plasma column, in contact with which the part is melted, is surrounded by a neutral gas, such as argon, insufflated via a peripheral pipe of the torch.

In order to deposit metal on the part, a metal powder may be added to the stream of argon in the vicinity of the arc.

The reflow tool 21 shown in FIG. 3 is a transferred-arc plasma torch used without addition of metal powder. The transferred arc 22 reflows a surface layer 23 of the wall of the adaptor. Moving helically over the inner wall of the adaptor at a controlled rate enables the defects in this wall to be eliminated in all the defective zones which have been detected.

It is necessary to adjust the torch 21 in order to reflow over a well-defined depth. The main parameters which are adjusted are the transferred-arc current, the transferred-arc voltage which is a function of the distance between the cathode and the part, the flow rate of gas forming the plasma, the speed of advance of the torch, the flow rate of shielding gas, the torch/part distance and the working position of the torch.

In the case of the reflow of the inner wall of an adaptor made of nickel alloy, the melting is performed under satisfactory conditions by employing a transferred arc with a current of 115 A at a voltage of 19.6 V, the distance between the torch and the part being from 2 to 2.5 mm, the flow rate of the argon forming the plasma being 1.5 l/min, the speed of the torch being 10 cm/min and the flow rate of shielding gas being 10 l/min. Beads of reflowed metal of 7.3 mm width are thus produced over a penetration depth of 1.5 mm. By increasing the power of the torch, reflows were also produced over a depth of from 3 to 4 mm.

As may be seen in FIG. 3A, it is also possible to use the transferred-arc plasma torch 21 to deposit a metal coating layer 24 on the inner surface of an adaptor 13a having defects.

This result is obtained by injecting a powder, for example a nickel alloy powder, into the plasma-generating gas in the vicinity of the arc.

The transferred arc 22 deposits particles of molten metal onto the inner wall of the adaptor simultaneously with of heating and a degree of melting of the wall of the adaptor which are favorable for the bonding of the layer 24. The defects in the wall of the adaptor are thus coated by a defect-free metal layer 24 of well-controlled thickness.

In addition, the reflow device includes an expandable plug 37 including two clamping plates 38a and 38b and a neoprene washer 39. The central portion of the small clamping plate 38a is integral with a threaded rod 38c passing into a central aperture in the small clamping plate 38b and onto which threaded rod a clamping nut 40 is engaged.

The small plate 38b includes guide rods such as 38d passing into apertures in the small plate 38a.

The plug 37 is installed in the adaptor 13a in the non-expanded state, before installing the melting device 21. The installation is carried out by the operator by employing a pole including a tightening wrench enabling the neoprene washer 39 to be radially expanded by tightening the nut 40 when the plug 37 is in place in the adaptor 13a.

The transferred-arc plasma melting device 21 is then installed inside the adaptor 13a, below the expandable plug 37 which is itself fixed inside the adaptor 13a, in a zone in the vicinity of the upper level of the head 1.

As may be seen in FIG. 3, the torch 21 is fixed in an offset manner in relation to the axis 13' common to the adaptor 13a and to the rotary support 20 of the torch, allowing its rotational and axial translational movement inside the adaptor. The internal surface of the adaptor is thus moved over by the transferred arc.

It is also possible to use, instead of a torch 21 parallel to the axis 13' of the adaptor, a torch placed in a direction inclined in relation to the axis 13', which is set into rotation with the rotary support in order to move over the internal surface of the adaptor.

Figure 4:
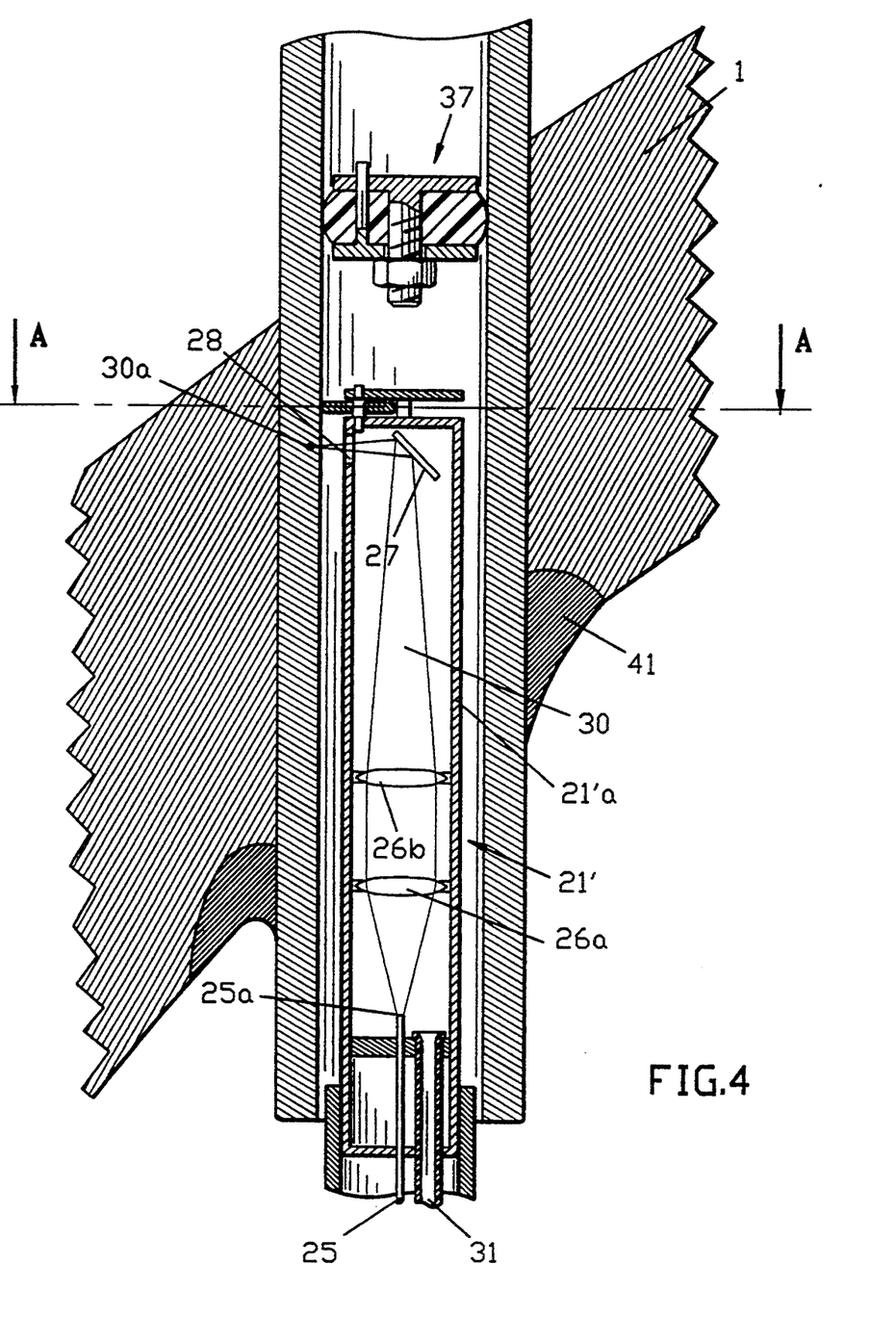
FIG. 4 is a view, in section and in elevation, of a portion of an adaptor into which a laser-beam melting device is inserted, enabling the first phase of the method according to the invention to be performed, according to a third variant.

As shown in FIG. 4, a laser-beam melting tool 21', instead of a transferred-arc plasma torch as described above, may be used to reflow the internal surface of the adaptor 13a.

The melting tool 21' includes an envelope constituting a case 21' a in which the optical components of the laser-beam melting device are arranged. These optical components include an optical fiber 25 directed along the axis of the case 21'a, lenses 26a and 26b centered on the axis of the case and a mirror 27 placed in a position which is inclined in relation to the axis of the case 21'a.

The case 21'a includes an exit port 28 in the upper portion of its lateral wall.

The optical fiber 25 includes an exit end 25a inside the case 21'a and an entrance end (not shown) connected to a laser radiation generator.

The exit end 25a of the fiber 25 is arranged in the vicinity of the focus of the lens 26a which forms a parallel beam directed onto the lens 26b. The parallel beam rendered convergent by the lens 26b is reflected by the mirror 27 towards the aperture 28 and the internal wall of the adaptor 13a.

The laser beam 30 forms a focal spot 30a at a depth which is completely adjustable beneath the internal surface of the adaptor 13a.

The metal of the wall of the adaptor 13a may thus be melted over a completely defined depth by adjusting the position of the focal spot 30a, for example by moving the lens 26b in relation to the lens 26a or by adjusting the power parameters of the laser and the speed of movement of the laser beam in relation to the wall.

The lower end wall of the case 21'a is penetrated by a pipe 31 connected to a source of neutral gas such as argon, so as to be able to scavenge the internal volume of the case and of the melting zone of the wall of the adaptor 13a. This protects the optical elements arranged in the case 21'a, removes smoke from the melting zone and cools the working head.

Figure 4A:
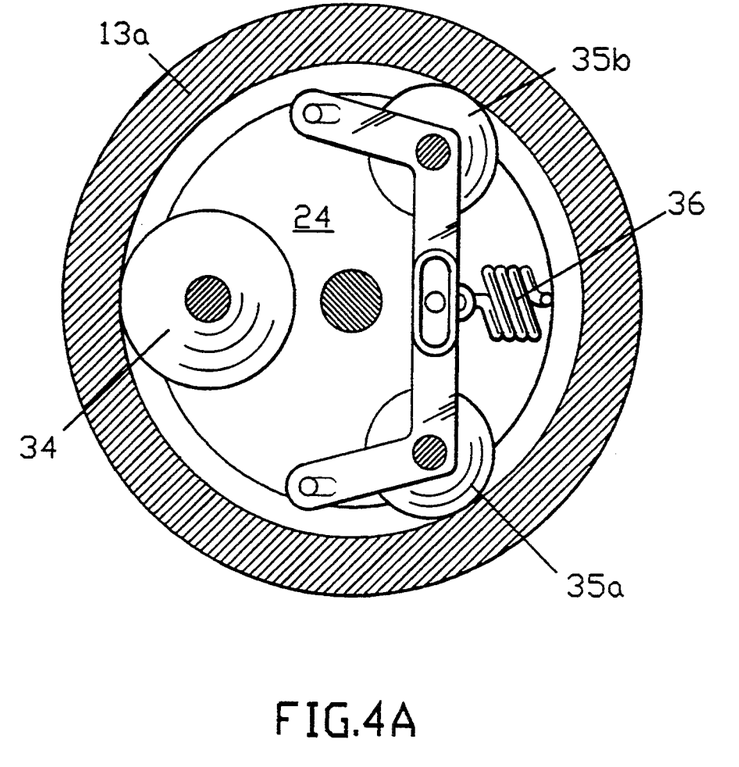
FIG. 4A is a sectional view along A—A of FIG. 4.

Guide means constituted by rollers, which can be seen in particular in FIG. 4A, are mounted on the upper end wall of the case 21'a. These guide means make it possible to maintain a fixed separation between the case 21'a and the internal wall of the adaptor 13a and to focus the beam 30 onto the focal spot 30a at a constant distance from the internal surface of the adaptor 13a.

The guide means include a follower roller 34 on the side of the case 21'a where the aperture 28 is located, two press-rollers 35a and 35b located on the opposite side to the aperture 28 and a spring 36 pressing the press-rollers 35a and 35b onto the internal surface of the adaptor 13a, when the case 21'a of the laser melting device 21' is inserted inside the adaptor 13a.

An expandable plug 37', identical to the plug 37 described above relative to the transferred-arc plasma reflow device, may be installed in the tube before inserting the laser melting tool.

As has been indicated earlier, the fiber 25 is supplied with laser radiation which is focused at a well-defined depth beneath the internal surface of the adaptor 13a.

The case 21'a of the laser melting device 21' is then moved translationally towards the axis of the adaptor 13a and, simultaneously, rotationally about this axis.

The follower roller 34, fixed to the upper portion of the case 21'a on the side of the aperture 28, maintains the focal spot 30a of the laser beam 30 at a well-defined depth beneath the internal surface of the adaptor 13a, during the translational and rotational movements, i.e., in a helical path, of the case 21'a and of the laser beam 30.

The metal of the wall of the adaptor 13a is thus melted over a well-defined depth in a helical zone covered by the laser beam 30 during the movement of the case 21'a inside the adaptor 13a.

The axial movement of the case 21'a inside the adaptor 13a is such that the internal surface of the adaptor 13a is covered, in a zone extensively overlapping the zone, in which cracks have been detected.

In particular, in the zone of the adaptor located facing the weld 41 on the vessel head 1, cracks are more frequently detected than in other zones, so that the internal surface of the adaptor is generally covered down to a lower zone of the adaptor located beneath the weld 41.

Figure 5:
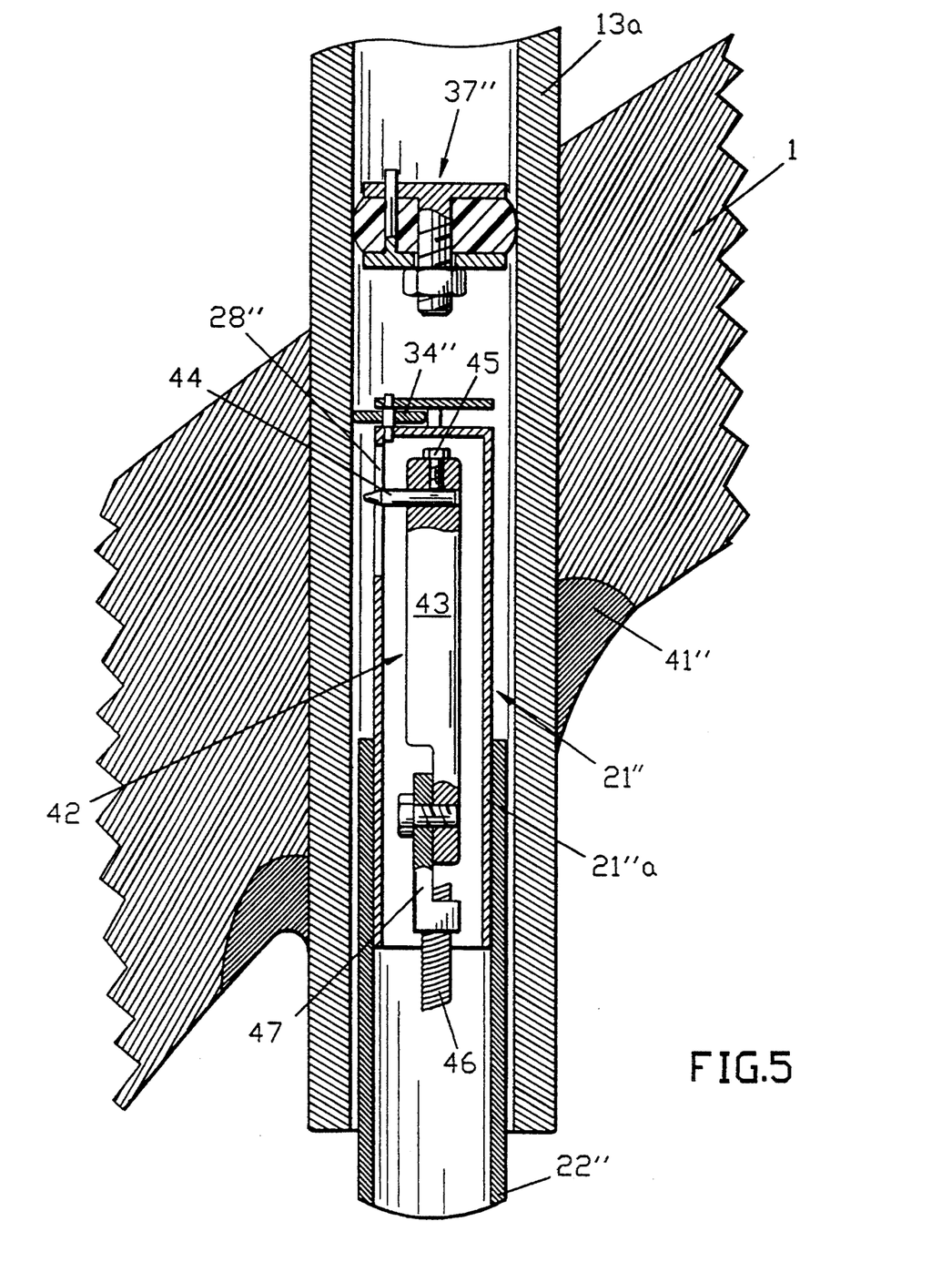
FIG. 5 is a view, in section and in elevation, of an adaptor into which a TIG welding torch is inserted in order to perform the first phase of the method according to the invention, according to a fourth variant.

FIG. 5 shows a further embodiment of the means enabling the metal of the wall of an adaptor 13a to be melted, over a defined thickness, in a zone considered as defective.

The device 21" shown in FIG. 5, intended to carry out the reflow of the wall of the adaptor 13a, includes an envelope constituting a case 21"a connected to a tubular follower 22" by means of which the melting device 21" is installed and moved inside the adaptor 13a. This installation and these movements are controlled, as previously, by an operator located on the maintenance/repair stand, beneath the mechanism plate 12.

Inside the case 21"a is fixed a TIG welding torch 42 including an electrode support 43, a tungsten electrode 44 fixed by means of a screw 45 to the support 42 and a cable 46 for supplying the electrode support 43 with high-intensity electrical current, which cable is connected to the support 43 by means of a terminal lug 47 in which a screw is engaged.

The case 21″a includes a port 28″ facing the electrode 44, in a direction which is radial in relation to the case 21″a and to the adaptor 13a.

An inert gas constituted by argon is insufflated into the follower 22″ and into the case 21″a so as to scavenge the zone during melting, in the region of the tip of the electrode 44, through the port 28″, and to cool the welding head.

The distance from the tip of the electrode 44 to the internal surface of the adaptor 13a is adjusted so that the wall of the adaptor 13a is melted, by the electrode supplied with electrical current, over a well-defined depth.

A follower roller 34″ enables the distance between the tip of the electrode 44 and the internal surface of the adaptor 13a to be maintained at a completely constant value during the movements of the melting device 21″.

Prior to the insertion of the device 21″ into the adaptor 13a, a plug 37″, substantially similar to the plug 37 described above, is installed in a zone of the adaptor 13a located in the region of the upper surface of the head 1′.

The plug 37″, like the plug 37, makes it possible to prevent the entrainment of smoke from the melting zone into the upper portion of the adaptor by the stream of inert gas.

In the case of an adaptor having a wall thickness of the order of 15 mm, the metal of the wall of the adaptor is melted, in the defective zone, over a depth of about 3 mm. Adjustment of the parameters of the transferred-arc plasma melting torch or the focusing, together with the power and speed-of-movement parameters of the laser beam or adjustment of the TIG electrode, are therefore performed so as to cause melting over a constant depth of 3 mm during the movement of the melting device.

The downward movement of the melting device, such 21, 21′ or 21″, inside the adaptor 13a, is continued until the lower portion of the adaptor, beneath the weld zone 41, has been melted.

The metal of the wall of the adaptor 13a which has been melted and then solidified is substantially free of defects, such as cracks, because any cracks existing in the defective zone close up upon melting of the metal.

However, the temperature rise of the metal in the melted and then solidified zone leads to the formation of stresses in the wall of the adaptor, in particular in the transition zones between that portion of the wall of the adaptor which has been subjected to melting and that portion which, after reflow or deposition of filler metal, has not been subjected thereto.

It is also possible to deposit a filler metal with the TIG torch, in order to cover over the defective zone. In this case too, the stressed state of the metal deposited is not favorable for ensuring good corrosion resistance.

In general, after reflow or deposition of filler metal the inner surface layers of the wall of the adaptor are in a stressed state which is not favorable for ensuring good corrosion resistance under the operating conditions of the nuclear-reactor vessel.

It is known, in the case of parts such as tubular parts coming into contact with a fluid under high pressure and at high temperature, to improve the stress-corrosion resistance of such parts by creating a favorable stress state in the wall or internal skin of the parts coming into contact with the high-temperature medium.

It has already been proposed, for example in the case of steam generator tubes made of nickel alloy, to create compressive stresses in the inner skin of such tubes, in particular in the transition zone between the zone deformed by expansion and rolling in the tube plate and the non-deformed zone of the tubes.

This subjection of the inner surface of the tubes to compression in order to improve their corrosion resistance may be performed by a peening or shot-blasting operation using particles made of a material having a hardness greater than the hardness of the alloy of the tubes.

Such a method has been described, for example in the French Patent No. 2,572,965 filed by the assignee of the present application.

Figures 6, 7:
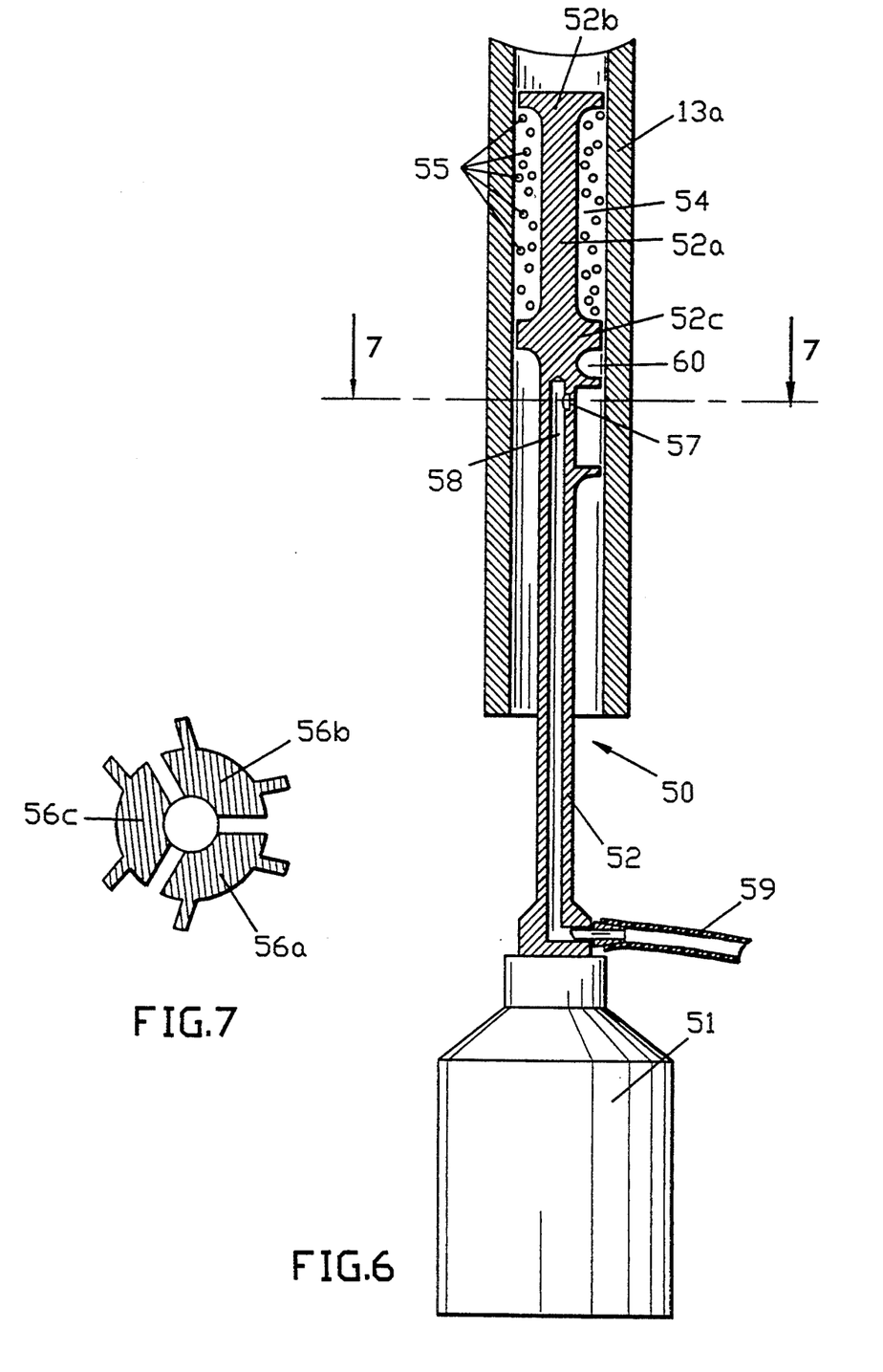
FIG. 6 is a view, in section and in elevation, of an adaptor penetrating the head of the vessel of a nuclear reactor into a which a shot-blasting device is inserted for implementing the second phase of the method according to the invention.
FIG. 7 is a sectional view along line 7—7 of FIG. 6.

FIG. 6 shows an adaptor 13a which has been subjected to an operation to melt an inner layer of its wall, in the manner described above.

After an inner layer of the adaptor 13a, has been melted and solidified the inner skin of the adaptor is subjected to compression by peening or shot-blasting using solid particles, by employing the tool 50 shown in FIG. 6 in a position of use inside the adaptor.

The tool 50 is constituted by an exciter 51 which includes a vibrating portion connected to a shaft 52 of elongate shape constituting a concentrating and resonating element which may be set into vibration by the exciter 51 which is connected to a magnetic-pulse generator supplied at a high frequency, for example of the order of 20,000 Hz.

The shaft 52 of the resonator of substantially cylindrical shape includes an upper portion 52a delimited externally by a symmetrical surface of revolution, the meridian of which is shown in FIG. 6.

The portion 52a, which exhibits has a reel or roller-cradle shape, is delimited by two circular cross-sectional enlarged portions 52b and 52c of the shaft 52, the diameter of which is slightly less than the internal diameter of the adaptor 13a.

The roller-cradle-shaped portion 52a, 52b, 52c of the shaft 52, when the shaft 52 is inserted into the adaptor 13a along its axial direction, as shown in FIG. 6, delimits, with the inner surface of the adaptor 13a, an annular space 54 in which balls 55 intended to peen and to subject to compression the inner skin of the adaptor 13a may be set into motion when the shaft 52 is vibrating.

As may be seen in FIGS. 6 and 7, the shaft 52 has three portions 56a, 56b and 56c arranged at 120° about the axis of the shaft 52 constituting, beneath the lower diametrally-enlarged portion 52c, three air-bearing centering shoes which include lips coming into proximity to the internal surface of the adaptor when the shaft 52 is inserted into the coaxial position inside the adaptor.

The centering shoes 56a, 56b and 56c are supplied with air, each via a diaphragm 57 communicating with a central channel 58 of the shaft 52 and arranged along the axis of this shaft.

The channel 58 is supplied with compressed air via a pipe 59 connected to a nozzle communicating with the channel 58, at the lower portion of the shaft 52.

Above the air-bearing shoes, the shaft 52 includes air recovery grooves 60 making it possible to prevent the inflow of air into the annular space 54 which will be designated hereinafter as shot-peening chamber.

In order to subject an inner layer of the wall of the adaptor 13a to compression by shot blasting or shot peening, in the zone of the inner surface of the adaptor which has been subjected to melting followed by solidification, the tool 50 is fixed to a support such as the support 16 shown in FIG. 2, which enables the shaft 52 of the tool 50 to be inserted into the adaptor in a completely coaxial arrangement.

Balls, for example steel balls, are inserted between the adaptor and the shaft 52, above the enlarged portion 52c, at the moment when the shaft 52 is inserted into the bore of the adaptor 13a.

The shaft 52 is inserted into the adaptor 13a, until the moment when the shot-peening chamber 54 is above the zone which has been melted beforehand.

The centering shoes 56a, 56b and 56c are supplied with compressed air, via the pipe 59, so as to center the roller cradle 52a of the shaft 52 inside the adaptor, without any contact with the internal wall of the adaptor.

The exciter 51 is supplied so as to set the shaft 52 into vibration.

The vibrations of the shaft 52 set the balls 55 inside the shot-peening chamber 54 into motion.

The balls 55 strike the inner wall of the adaptor 13a, either directly or by elastic recoil, after having struck the external surface of the roller cradle 52a or of other balls.

An inner surface layer of the adaptor 13a, called inner skin, is thus subjected to compression on account of the repeated impact of the balls 55 on the internal wall of the adaptor.

The energy and frequency of vibration, the diameter and number of balls, and the specific characteristics of the shaft 52 and of the material with which the balls are formed make it possible to subject the inner skin of the adaptor to compression over a depth which may reach 0.5 mm.

The layer subjected to compression may, of course, have a thickness and characteristics which can vary, so as to obtain an optimum stress-corrosion resistance in the environment of the nuclear-reactor vessel.

The compression-subjecting tool 50 is moved in the vertical direction, at a constant relatively slow speed, by employing a movement device such as the device 16 shown in FIG. 2 and by moving this device along the guide column 17.

The amplitude of the movement in the vertical direction of the shaft 52 and of the shot-peening chamber 54 is such that the internal surface of the adaptor 13a is subjected to compression by shot peening in a zone completely overlapping the zone in which a surface layer has been previously melted and solidified.

The tendency of the internal surface of the adaptor 13a to crack and to corrode in the treated zones is thus eliminated.

In the case of an adaptor penetrating the head of the vessel of a pressurized-water nuclear reactor, made from a nickel alloy such as alloy 600, it is possible to employ, in order to subject the internal surface of the wall of the adaptor to compression by shot peening after having caused this wall to melt over a depth of the order of 3 mm, steel balls whose diameter is approximately 5 mm.

The vibrating shaft 52 of the resonator includes enlarged portions 52b and 52c, the diameter of which is slightly less than the internal diameter of the adaptor 13a, so that a clearance of the order of 2 mm remains around the enlarged portions 52b and 52c of the shaft 52 in the centered position inside the adaptor 13a.

The shot-peening chamber is thus partially closed so as to prevent any of the balls 55 from leaving and the shaft 52 is completely isolated from the adaptor 13a, with the result that shaft 52 may vibrate freely inside the adaptor.

Were the shaft 52 to come into contact with the internal wall of the adaptor 13a, the vibrations of the shaft 52 would be absorbed and damped and the internal surface of the adaptor 13a would risk becoming scratched or damaged by the outer surfaces of the portions 52b and 52c of the shaft 52.

The shot-peening operation is continued by moving the vibrating shaft 52 inside the adaptor, either continuously or by successive zones, until the moment when the shot-peening chamber reaches the lower portion of the adaptor, beneath the weld zones.

The adaptor then exhibits an inner skin free of cracks and which is subjected to compression so that the internal surface of the adaptor is capable of withstanding cracking and corrosion in the environment of the nuclear-reactor vessel.

An inspection of the internal surface of the adaptor is then carried out, for example by eddy currents or by ultrasound. A new thermal sleeve is fixed which may be welded or dismantled by subsequent repair operations, inside the adaptor. Repair operations are carried out in the manner which has just been described on all the adaptors exhibiting defects.

After completing these operations, the head may be put back into service.

The method according to the invention therefore enables the internal surface of the wall of the adaptor to be repaired so that this internal wall is free of open cracks and exhibits a state of compression favorable to good crack and corrosion resistance.

To carry out the reflow of an inner layer of the wall of a tubular part, devices other than the transferred-arc plasma, laser-beam or TIG-electrode devices which have been described above may be used.

It may be also possible to employ devices other than the shot-peening tool which has been described above in order to perform the subjecting to compression by repeated impacts of particles on the internal surface of the adaptor.

It is possible, for example, to employ a method and a device for subjecting to compression by shot blasting, such as described in the French Patent No. 2,572,965 owned by the assignee of the present invention. Of course, it is necessary to adapt the method and the device, in the case where the tubular part which is subjected to compression is different from a steam generator tube. In the case of an adaptor or of a sleeve for penetrating the vessel bottom head providing for the passage of an instrumentation conduit, these parts being made of nickel alloy such as alloy 600, the method and the device employed in the case of steam generator tubes may be easily adapted, in order to perform a compression operation under satisfactory conditions.

In the case of a tubular part, it is also possible to employ a device for peening using particles of hard material which are fixed to the end of thin flexible strips rigidly connected to a spindle which is set into rotation at very high speed inside the tubular part. Under the effect of the rotation and of the centrifugal forces, the particles strike the internal surface of the tubular part. This technique is generally designated by the term "rotopeening".

The invention applies not only to the case of adaptors but also to penetration sleeves or other tubular parts fixed to the vessel or in any other primary portion of a pressurized-water nuclear reactor.

The method according to the invention may be employed for repairing parts which are non-tubular and/or which are employed in a context other than a pressurized-water nuclear reactor.

I claim:

1. Method for repairing a defective zone of a wall of a metal part having a defective zone, said method comprising the steps of:
   (a) moving a heat-source over said defective zone of said wall;
   (b) melting the metal of said wall in said defective zone over a defined depth through said heat-source;
   (c) allowing said metal after melting to solidify into a solidified metal layer of said wall; and
   (d) subjecting at least a surface layer of said solidified metal layer of said wall to compression by repeated impacts of balls set into motion in the vicinity of the solidified metal layer of the wall by vibrating means.

2. Method according to claim 1, wherein melting of said metal of said wall is caused by a transferred-arc plasma with insufflation of an inert gas into a zone in which an arc between an electrode and said metal part is formed.

3. Method according to claim 2, wherein said inert gas is argon.

4. Method according to claim 2, further comprising insufflation a metal powder into said zone in which said arc is formed so as to deposit a metal layer onto a surface of said metal part.

5. Method according to claim 1, wherein melting of said metal of said wall is caused by a heat source constituted by a laser beam.

6. Method according to claim 5, comprising focusing said laser beam so as to form a focal spot at a constant depth inside said wall of said metal part.

7. Method according to claim 1, wherein melting of said metal of said wall is caused by an electrical current conveyed to an electrode which is moved in a vicinity of a surface of said defective zone.

8. Method according to any one of claims 5 to 6, further comprising insufflation an inert gas onto said surface of said defective zone during melting.

9. Method according to claim 1, wherein said metal part is a tubular adaptor for penetrating a head of a vessel of a nuclear reactor, said adaptor being made of nickel alloy and having a wall thickness of the order of 15 mm, said wall of said adaptor being melted over a thickness of the order of 3 mm.

10. Method according to claim 9, wherein an internal surface of said adaptor is subjected to compression by repeated impacts of steel balls which have a diameter of approximately 5 mm and are set into motion by a vibrating shaft inserted into the adaptor and connected to an exciter supplied by a high-frequency current.

11. Method for repairing a defective zone of a wall of an adaptor for penetrating a head of a vessel of a pressurized-water nuclear reactor, in which a thermal sleeve is arranged, a metal of said wall exhibiting defects in a defective zone of said wall, said method comprising the steps of:
   (a) cutting said thermal sleeve of said adaptor to be repaired by one of cutting tool, water-jet or electrical-discharge machining;
   (b) extracting said thermal sleeve of said adaptor;
   (c) inspecting an internal surface of said adaptor by one of eddy currents, ultrasound and liquid penetration, so as to locate a zone to be repaired;
   (d) melting with the aid of a heat source and solidifying the metal of said wall of said adaptor, in said defective zone;
   (e) subjecting a surface layer of said metal of said wall of said adaptor, at least in said defective zone, after melting and solidifying, to repeated impacts of balls set into motion in a vicinity of said surface layer by vibrating means;
   (f) inspecting the zone of said adaptor which has been melted, solidified and compressed by using one of eddy currents and ultrasound; and
   (g) positioning a new thermal sleeve inside said adaptor.

12. Device for repairing a defective zone of an internal surface of a tubular part, said device comprising
   (a) a melting device having a generally tubular shape and a diameter which is less than an internal diameter of said tubular part;
   (b) a tool for subjecting said internal surface of said tubular part to compression by repeated impacts of balls, comprising an exciter connected to a high-frequency current source and including a vibrating portion, as well as a vibrating shaft connected to said vibrating portion of said exciter and including an end portion which has a symmetric concave external surface of revolution about an axis of said vibrating shaft and is delimited by two portions of diametrally-enlarged circular cross-section, the diameter of which is less than the internal diameter of said tubular part and means for centering said shaft in coaxial position inside said tubular part; and
   (c) means for moving said melting device and said tool in an axial direction of said tubular part.

13. Device according to claim 12, further including means for rotationally moving said melting device inside said tubular part, about an axis of said tubular part.

14. Device according to claim 12 or 13, wherein the melting device is a transferred-arc plasma welding torch including an electrode and at least two pipes arranged peripherally around said electrode and connected to a source of inert gas.

15. Device according to claim 12 or 13, wherein the melting device is a laser-beam melting device including, inside an envelope, an exit end part of an optical fiber, optical means for focusing and orienting a laser beam travelling into said envelope via said fiber, so as to direct said laser beam towards said internal surface of said tubular part and to focus said laser beam inside said wall of said tubular part, and including means for guiding said envelope inside said tubular part while maintaining a constant separation between said envelope and said internal wall of said tubular part.

16. Device according to claim 15, including a pipe for supplying an internal volume of said envelope with an inert gas.

17. Device according to claim 16, wherein said means for centering said shaft are constituted by air-bearing shoes supplied with compressed air via a channel in an axial arrangement inside said shaft.

18. Device according to claim 17, wherein said shaft includes at least one groove between the end portion delimiting a shot-peening chamber and said air-bearing centering shoes so as to recover the air injected to said air-bearing shoes.

* * * * *